United States Patent [19]

Chakrabarti et al.

[11] 4,329,268

[45] May 11, 1982

[54] POLYETHYLENEOXY SULFONATE SURFACTANTS

[75] Inventors: Paritosh M. Chakrabarti, Cedar Grove; Darrell G. Kirchner, Vernon, both of N.J.

[73] Assignee: GAF Corporation, New York, N.Y.

[21] Appl. No.: 260,466

[22] Filed: May 4, 1981

Related U.S. Application Data

[63] Continuation-in-part of Ser. No. 81,322, Oct. 3, 1979, abandoned.

[51] Int. Cl.$^3$ .............................................. C08F 2/30
[52] U.S. Cl. ..................................... 524/166; 526/209
[58] Field of Search .................. 260/29.6 Z, 29.6 SQ, 260/29.7 H, 29.7 SQ; 526/209

[56] References Cited

U.S. PATENT DOCUMENTS

| | | | |
|---|---|---|---|
| 2,115,192 | 4/1938 | Bruson | 260/512 R |
| 2,148,432 | 2/1939 | Bruson | 260/512 R |
| 2,209,911 | 7/1940 | Bruson | 260/613 |
| 3,485,896 | 12/1969 | Popa | 526/209 |
| 3,531,454 | 9/1970 | Ito | 526/209 |
| 4,091,014 | 5/1978 | Johnson | 260/512 R |
| 4,148,746 | 4/1979 | Klemmensen | 260/29.6 Z |

*Primary Examiner*—Paul R. Michl
*Attorney, Agent, or Firm*—J. Magee, Jr.; S. H. Parker

[57] ABSTRACT

High acid content latexes can be produced through the use of novel polyethyleneoxy sulfonates surfactants. An aqueous emulsion can be produced from the reaction product of vinyl acid monomer and another copolymerizable monomer or monomers. The vinyl acid monomer being present in an amount equal to about 5% to about 50% by weight based on total weight of the monomers and the surfactant is present in an amount equal to about 0.1 to about 10 weight percent based on the total weight of monomers and is represented by the formula:

$$R_1(R_2)_yO(CH_2CH_2O)_{n-1}CH_2CH_2SO_3Me$$

wherein:
$R_1$ is an alkyl having at least 6 carbon atoms;
$R_2$ is an aryl group;
n is at least 3; and
Me is $NH_4$, Na, Li or K.
Y is 0 or 1.

16 Claims, No Drawings

POLYETHYLENEOXY SULFONATE SURFACTANTS

This application is a continuation-in-part of copending patent application Ser. No. 081,322, filed Oct. 3, 1979 now abandoned and is related to U.S. patent application Ser. No. 081,322, filed Oct. 3, 1979, which application discloses and claims different but related subject matter.

BACKGROUND OF THE INVENTION

1. Field of the Invention

The present invention relates to novel salts of polyethyleneoxy sulfonates, their method of manufacture and their use as surfactants in high acidity latexes, such as latexes of copolymers of acrylic acid.

2. Description of the Prior Art

Surfactant sold under the trademark Triton by Rohm & Haas Co. and Alipal SE-463 by GAF Corp. are alkyl aryl polyether sulfonate, sodium salts. These sulfonates offer many diversified surfactant properties not commonly encountered in a single compound. They out perform comparable sulfates in offering resistance to decomposition under both highly acidic and basic conditions, thus being suitable in metal cleaning applications for either acid pickling baths or alkaline cleaning formulations. Their excellent compatibility with alkaline detergent builders and their excellent emulsifying character with fats, greases, oils and gelatins afford many applications possibilities in lime soap formulation, the film coating industry, as dye leveling agents, post-latex stabilizers and in emulsion polymerization. A major application for this type of surfactant is a shampoo base for the cosmetics industry where it finds wide applicability because of its detergent, lathering and solubilizing properties.

However, it has now been found that in certain applications, as for example the production of high acid level latexes, such as, acrylic and methacrylic acid copolymer latexes containing in excess of 10% acetic acid, coagulation occurs. The problem becomes most acute when life of these latexes renders them unusable in many industrial applications because of the commonly encountered need to store the latex before further processing can be commenced.

SUMMARY OF THE INVENTION

It has now been found that high acid content latexes can be produced through the use of novel polyethyleneoxy sulfonates surfactants in accordance with the present invention. An aqueous emulsion is produced from the reaction product of vinyl acid monomer and at least a second copolymerizable monomer, said vinyl acid monomer being present in an amount equal to about 5% to about 50% by weight based on total weight of said vinyl acid monomer and said at least a second copolymerizable monomer. The surfactant being present in an amount equal to about 0.1 to about 10 weight percent based on the total weight of said vinyl acid monomer and said at least a second copolymerizable monomer and is represented by the formula:

$$R_1(R_2)_yO(CH_2CH_2O)_{n-1}CH_2CH_2SO_3Me$$

wherein:
$R_1$ is an alkyl having at least 6 carbon atoms,
$R_2$ is an aryl group;
n is at least 3; and
Me is $NH_4$, Na, Li or K.

DESCRIPTION OF THE PREFERRED EMBODIMENTS

In order that those skilled in the art can more fully understand the present invention, the following detailed description and examples are provided. These examples are intended solely for the purpose of illustrating the invention, and are not to be construed as expressing limitations unless so set forth in the appended claims. All parts and percentages are by weight, unless otherwise stated.

Salts of non-ionic surfactants of the type sold under the trademark ALIPAL, by GAF Corporation, are generally recognized as having utility in emulsion polymerization. These surfactants are represented by the formula:

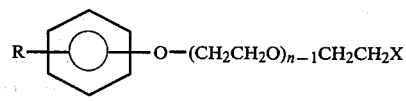

Commercial surfactants include ALIPAL SE-463, wherein R is $C_8H_{17}$, X is $NaSO_3$ and n is 3.

The surfactants of Table I can all be represented by the formula:

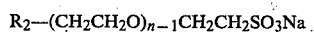

Alfol is a trademark of the Continental Oil Company.

In Alfol 1012+3 E.O. Sulfonate, $R_2$ is a straight chain alcohol having an average of between 10 and 12 carbons and n is 3.

In Alfol 12+4 E.O. Sulfonate, $R_2$ is a straight chain alcohol having 12 carbons and n is 4.

In oxotridecyl+4.2 E.O. Sulfonate, $R_2$ is an oxotridecyl group and n averages about 4.2 ethyleneoxy groups.

In Emulphogene BC-720, $R_2$ is tridecyloxy ($C_{13}H_{27}O$) and n is greater than about 9. Emulphogene is a trademark of GAF Corporation.

Looking now in greater detail to the chemistry of the production of the surfactants of the present invention it is noted that the synthetic approach to the production of poly ether sulfonate type surfactants involves the reaction of chlorine capped nonionics with sodium sulfite, as disclosed in U.S. Pat. No. 2,115,192.

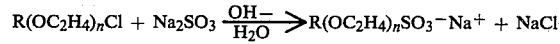

The reaction requires high temperature—155°–170° C. being the most desirable range—and pressures of 70–115 psig. To attain over 90% conversion of the chlorine terminated nonionics, reaction times of about 20 hours are typical. The rate of sulfonation appears to be 100 to 500 times the rate of hydrolysis under proper reaction conditions such that good conversions can be expected with most nonionic types under the reaction conditions to be defined in this report. The competing hydrolysis reaction results in a portion of OH terminated nonionics being present in the reaction product as depicted below.

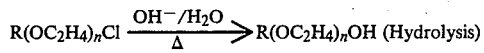
$$R(OC_2H_4)_nCl \xrightarrow[\Delta]{OH^-/H_2O} R(OC_2H_4)_nOH \text{ (Hydrolysis)}$$

The sulfonate method of preparation is well-known to those skilled in the art as represented by patents such as U.S. Pat. Nos. 4,091,014, 2,209,911 and 2,148,432.

U.S. Pat. No. 4,091,014 is noted to disclose the manufacture of ether sulfonates, by sulfonating alcohols such as:

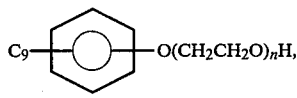

$C_9$——O$(CH_2CH_2O)_nH$, where n is an integer such as 3, 4 and 5. U.S. Pat. No. 2,209,911 discloses the production of alkylated phenoxy ether halides, while U.S. Pat. No. 2,148,432 discloses the method of producing alkyl phenoxy polyethylene oxide sulfonates from the corresponding alkyl phenoxy poly ethoxy halide. It should thus be evident that the sodium salts of polyether sulfonates of the present invention can be made in accordance with the teachings of the aforenoted patents.

1. Preparation of Alfol 1012+3 EO Ether Sulfonate (a) Chlorination

A 1 liter r.b. flask equipped with mechanical stirrer, thermometer, dropping funnel and condenser adapted to a caustic scrubber was charged with 600 gms of thionyl chloride (2.0 moles). To it were added 286 gms of thionyl chloride (2.4 moles) maintaining the reaction mixture 55° C. during addition. The mixture was then heated to 100° C. for 1 hour, the condenser removed and heated to 100°–110° C. with an air purge for 2½ hours. The appearance of the chloride was improved by the addition of 3 gms of 30% $H_2O_2$ at 80° C. and heating to 100°–110° C. for 15 minutes (VCS 15 initial; VCS 9.5 final). Analysis: Cl 11.67/11.2 (actual/theory).

(b) Sulfonation

A charge of 420 gms of the Alfol 1012+3 EO chloride (1.32 moles) was combined with 175 gms of $Na_2SO_3$ (1.39 moles), 1000 ml of distilled water and 4.5 gms of 50% NaOH in a 1 gallon autoclave and reacted at 160°±5° C. for 20 hours. Stirring speed was 1750 rpm. The product was cooled to 40° C. and discharged. It was a viscous, light yellow liquid (VCS 4+) having a ethylenic Blue (M.B.) activity of 25.7% (80.8%) based on a molecular weight of 386, a chloride content of 5.27% and a pH of 5.3 (20% solution). The excess sulfite was removed by adding 16.5 gms of 30% $H_2O_2$ at 30°–40° C. and the pH adjusted to 7.2 with 9.5 gms of 50% NaOH. The final product properties include 1.83% $Na_2SO_4$, 4.64% NaCl and 36.2% total solids.

2. Preparation of Alfol 12+4 EO Ether Sulfonate (a) Chlorination

A 1 liter round bottom flask equipped with mechanical stirrer, thermometer, dropping funnel and condenser adapted to a caustic scrubber was charged with 500 gms (1.38 moles) of Alfol 12+4 EO. To it were added 205 gms (1.73 moles) of thionyl chloride at a rate of which conveniently maintained the temperature below 55° C. The mixture was then heated to 100°–105° C. from 4 hrs and the disappearance of the IR absorption at 3500 cm$^{-1}$ (OH) monitored. When the OH band had been removed, the condenser was removed and the chlorosulfite heated to 100°–110° C. with an air purge to remove to the $SO_2$ formed. The air purging and heating were continued for 4 hours until the inorganic chloride had dropped to 0.07%. Analysis: Cl, 9.34/9.33 (actual/theory).

(b) Sulfonation

A charge of 440 gms of the Alfol 12+40 EO chloride (1.16 moles) was combined with 158 gms of $Na_2SO_3$ (1.25 moles), 880 gms of distilled water and 8 gms of 50% NaOH in a 1 gallon autoclave and reacted at 165°±5° C. for 20 hours. Stirring speed was 1750 rpm. The product was cooled to 60° C. and discharged. It was a viscous, clear liquid (VCS 2+) which solidified on standing overnight (it has a m.pt. of 28° C. and if diluted to a M.B. activity of 19% remains a liquid at room temperature). Preliminary data indicated a methylene blue activity of 28.8% (72.7%) based on a molecular weight of 448, and a chloride content of 4.32% (84%). The excess sulfite was removed by adding 22 gms stirring at room temperature (a starch-iodine test confirmed the absence of sulfite) and the pH ws adjusted to 7.3 to 4.5 gms of 50% NaOH. Final product properties include 1.87% $Na_2SO_4$, 2.95% NaCl, 40.2% total solids, 4.76% nonionics.

3. Preparation of Oxo-Tridecyl+4.2 EO Ether Sulfonate (a) Chlorination

A 2 l. flask equipped with mechanical stirrer, thermometer, dropping funnel and condenser adapted to a caustic scrubber was charged with 800 gms of Emulphogene BC-420 (2.4 moles.) To it were added 343 gms of thionyl chloride (2.88 moles) maintaining the temperature below 55° C. during addition. The reaction mixture was then heated to 100°–105° C. for ½ hour, the condenser removed and heating to 100°–105° C. continued for 1½ hours with an air purge (subsurface) to remove $SO_2$. The appearance of the chloride was improved by the addition of 30 gms of 30% $H_2O_2$ at 70° C. and heating to 100° C. for ½ hour (VCS 18 initial; VCS 12 final). The final inorganic chloride was 0.1% Analysis Cl 9.91/10.1 (actual/theory).

(b) Sulfonation

A charge of 445 gms of the Emulphogene BC-420 chloride (1.27 moles) was combined with 168 gms of $Na_2SO_3$ (1.33 moles), 1000 ml of distilled water and 10 gms of 50% NaOH in a 1 gallon autoclave and reacted at 165°±50° C. for 20 hours at 1750 rpm. The product was cooled to 40° C. and discharged. It was a viscous gelatenous material having a M.B. activity of 22.9% (70.1%) based on a molecular weight of 418, an inorganic chloride content of 4.68% and a pH of 6.7 (20% solution). The excess sulfite was removed by the addition of 72 gms of 30% $H_2O_2$ and the pH adjusted to 7.5 with 9 gms of 50% NaOH. The final product properties include 2.36% $Na_2SO_4$, 4.41% NaCl and 34.6% total solids. Dilutions to 13% M.B. activity with water also provide a clear liquid above 70° C. which clouds on slight cooling.

4. Preparation of Nonylphenol+9 EO Ether Sulfonate

(a) Chlorination

A 3 l. flask equipped with mechanical stirrer, thermometer, dropping funnel and condenser adapted to a caustic scrubber was charged with 2000 gms of Igepal CO-630 (3.28 moles). To it were added 540 gms of thionyl chloride (4.54 moles) maintaining the reaction temperature below 60° C. When the addition was completed the reaction mixture was heated to 120° C. for $\frac{1}{2}$ hour at which time an IR revealed no OH band at 3500 cm$^{-1}$. The condenser was removed and heating at 100°-110° C. continued with removal of $SO_2$ by a subsurface nitrogen purge. The heating was continued for a total of 7 hours whereupon conversion to the chloride was essentially complete. The appearance of the chloride was improved by bleaching with 50 gms of 30% $H_2O_2$ at 70°-90° C. for 15 minutes (VCS 18 initial, VCS 13 final). Analysis: Cl 5.51/ 5.63 (actual/theory).

(b) Sulfonation

A charge of 638 gms of the Igepal CO-630 chloride (1.0 mole) was combined with 131 gms of $Na_2SO_3$ (1.0 mole), 1200 ml of distilled water and 6.0 gms of 50% NaOH in a 1 gallon autoclave and reacted at 160°±5° C. for 20 hours at 1750 rpm. The product was cooled to 40° C. and discharged. It was a very viscous clear yellow liquid having a M.B. activity of 25.5% (71.4%) based on a molecular weight of 698, a chloride content of 2.98% (101%) and a VCS of 2. The excess sulfite was removed by the addition of 16 gms of 30% $H_2O_2$ and the pH adjusted to 7.4 with 9 gms of 50% NaOH. The final product properties include 1.48% $Na_2SO_4$, and 40.3% total solids.

5. Preparation of Nonylphenol and 20 E.O. Ether Sulfonate

The procedure employed for producing the nonylphenol 9 E.O. ether sulfonate can be followed using Igepal CO-850 and thionyl chloride in a 1 to 1.5 mole ratio in the chlorination procedure and a 1 to 1 Igepal CO-850 chloride to sodium sulfite mole ratio in the sulfonation procedure.

The theory of the invention is not fully understood and discussions of the theory of operation are for the purposes of contributing clarity and understanding and are not intended by way of limitation.

The sulfonate surfactants enable the emulsion to remain stable over extended periods of time. The percent of vinylic acid which can be present without encountering a stabilization problem increases with decreasing percent solids in the emulsion. Thus, while at 60% acid content and 40% solids coagulation occurs, decreasing either or both the acid content or solids levels, produces the desired coagulation free emulsion.

The concentration of the surfactant in the system is not narrowly critical and generally, a surfactant concentration range from about 0.1 to about 10 percent by weight of total monomer concentration gives the desired result.

Preparation of a Butyl Acrylate-Styrene-Methacrylic Acid (50-25-25) Terpolymer Latex To a 2 liter resin kettle was added 9.8 g. of the desired surfactant (based on 100% methylene blue activity), 291.5 g. water (including water present in the surfactant, and 0.5 g. potassium persulfate. Nitrogen purge was started immediately. To the kettle was added 37.5 g. butyl acrylate, 19.0 g. styrene, and 19.0 g. methacrylic acid. The kettle was then heated with stirring to 75°-80°. While the kettle was being heated to the final temperature, a pre-emulsion was prepared which contained 2.8 g. surfactant, 139.2 g. water, 0.5 g. potassium persulfate, 112.5 g. butyl acrylate, 56.0 g. styrene, and 56.0 g. methacrylic acid. The pre-emulsion was transferred to a pressure-equalizing addition funnel. The funnel was fitted with a mechanical stirrer, and was attached to the kettle. When the kettle reached 75°-80°, the stirred pre-emulsion was added dropwise over a 3 hour period. The 75°-80° range was maintained throughout. When addition was complete, heat was continued an additional 40 minutes to insure complete reaction. The kettle was then cooled to room temperature and the latex was discharged through a 60 mesh sieve.

Preparation of a Butyl Acrylate-Styrene-Methacrylic Acid (30-30-40) Terpolymer Latex To a 2 liter resin kettle was added 9.8 g. of the desired surfactant (based on 100% methylene blue activity), 291.5 g. water (including water present in the surfactant, and 0.5 g. potassium persulfate. Nitrogen purge was started immediately. To the kettle was added 28.3 g. butyl acrylate, 28.3 g. styrene, and 37.75 g. methacrylic acid. The kettle was then heated with stirring to 75°-80°. While the kettle was being heated to the final temperature, a pre-emulsion was prepared which contained 2.8 g. surfactant, 139.2 g. water, 0.5 g. potassium persulfate, 84.2 g. butyl acrylate 84.2 g. styrene and 112.25 g. methacrylic acid. The pre-emulsion was placed in a pressure-equalizing addition funnel. The funnel was fitted with a mechanical stirrer, and was attached to the kettle. When the kettle reached 75°-80° the stirred pre-emulsion was added dropwise over a 3 hour period. The 75°-80° range was maintained throughout. When addition was complete, heat was continued an additional 40 minutes to insure complete reaction. The kettle was cooled to room temperature and the latex was discharged through a 60 mesh sieve.

Preparation of Methacrylic Acid-Butyl Acrylate (60-40) Latex

To a 2 liter resin kettle was added 260.5 g. water, 40.75 g. Igepal CO-630 sulfonate (24.5% methylene blue activity), and 0.5 g. potassium persulfate. Nitrogen purge was started immediately. To the kettle was being heated to the final temperature, a pre-emulsion was prepared which contained 11.75 g. Igepal CO-630 sulfonate, 130.25 g. water, 0.5 g. potassium persulfate, 134.4 g. methacrylic acid, and 89.6 g. butyl acrylate. The pre-emulsion was placed in a pressure-equalizing addition funnel fitted with a mechanical stirrer. When the kettle temperature was reached, dropwise addition of the pre-emulsion was begun. Although addition was to proceed over 3 hours, the reaction was stopped after 30 minutes because of complete coagulation.

The latexes which can be produced can have in excess of 5% of an acidic monomer. Although, specific reference has heretofore been made to methacrylic acid, polymerizable ethylenically unsaturated monocarboxylic and polycarboxylic acids as well as the available anhydrides, nitriles, unsubstituted amides and substituted (including N-substituted) amides of said acids, can also be employed as comonomers.

More particularly, monoethylenically unsaturated monocarboxylic acids such as acrylic acid, methacrylic acid, ethacrylic acid and crotonic acid, monoethylenically unsaturated dicarboxylic acids such as maleic acid, fumaric acid, itaconic acid and citraconic acid, and monoethylenically unsaturated tricarboxylic acids such as aconitic acid can be employed, as can their halogen-substituted (e.g., fluroro- chloro- and bromo-substituted) derivates, e.g. -chloroacrylic acid, and the anhydrides of these acids, if available, e.g., maleic anhydride, fumaric anhydride and citraconic anhydride.

In the terpolymer examples, butyl acrylate has been specifically disclosed, but other polymerizable acrylate monomers, as for example methyl acrylate, ethyl acrylate, propyl acrylate, n-butyl acrylate, isobutyl acrylate, 2-ethylhexyl acrylate, methyl methacrylate, ethyl methacrylate, isobutyl methacrylate and 2-ethylhexyl methacrylate can be used. Other copolymerizable monomers which can be used include styrene and vinyl acetate.

(d) % Solids

Three weighing pans are tared, about 5 g. of the latex is placed in each, and the samples are placed in a 110°–120° oven for 2 hours. The dried sample is then weighed, and % solids is calculated from (dry weight/wet weight)×100.

(e) Surface tension is measured with a Fisher Tensiomat.

(f) pH is measured with any available pH meter.

(g) Turbidity

A sample of the latex is placed in a test tube and diluted with a 1% solution of sodium lauryl sulfate to give an absorbance reading of between 0.5 and 0.8 at 450 mm in a Spectronic 20 visible spectrometer. Absorbance readings are made at 450, 500, 550 and 660 mm. The slope of a best fit straight line for the relationship of log (absorbance) versus log (wavelength) is determined with at least squares computer program. This slope is recorded as turbidity.

TABLE I

| Surfactant | Butyl Acrylate | Styrene | Methacrylic Acid | Coagulum | Mechanical Stability | Brookfield Viscosity | % Solids | Turbidity | pH | Surface Tension |
|---|---|---|---|---|---|---|---|---|---|---|
| Igepal CO-630 - Sulfonate | 50% | 25% | 25% | V. Slight | OK | 29(1–60) | 42.9 | 3.78 | 3.3 | 48.4 |
| Igepal CO-630 - Sulfonate | 30% | 30% | 40% | 0.2% | OK | 7500(2–3) | 50.2 | 3.03 | 3.2 | 68.0 |
| Alfol 1012 & 3 E.O. Sulfonate | 50% | 25% | 25% | 1.9% | OK | 11(1–60) | 39.6 | 1.77 | 2.6 | 42.0 |
| Igepal CO-630 - Sulfonate | 40% | 0% | 60% | 100% | — | — | — | — | — | — |
| | 50% | 25% | 25% | Foam** | OK | 120(1–30) | 40.9 | 2.11 | 2.9 | 52.0 |
| (Oxotridecyl & 4.2 E.O.) Sulfate | 50% | 25% | 25% | Foam* | OK | 104(1–30) | 43.3 | 2.06 | 3.0 | 48.0 |
| (Oxotridecyl & 4.2 E.O.) Sulfonate | 50% | 25% | 25% | Foam | OK | 25(1–60) | 41.5 | 3.29 | 2.8 | 43.0 |
| (Oxotridecyl & 4.2 E.O.) Sulfonate | 50% | 25% | 25% | Foam | OK | 32(1–60) | 41.0 | 3.34 | 2.75 | 39.0 |
| (Alfol 1012 & 3 E.O.) Sulfonate | 50% | 25% | 25% | 7.5 gm | OK | 20(1–60) | 40.9 | 1.81 | 2.6 | 45.0 |
| | 50% | 25% | 25% | Foam | OK | 21(1–60) | 42.9 | 3.53 | 2.75 | 53.0 |
| (Igepal 850) - Sulfonate | 50% | 25% | 25% | Foam | OK | 26(1–60) | 40.5 | 3.44 | 2.8 | 48.0 |
| (Alfol 12 & 4 E.O.) Sulfonate | 50% | 25% | 25% | Foam | OK | 40(1–60) | 41.2 | 2.91 | 2.75 | 43.0 |
| (Alfol 12 & 4 E.O.) Sulfonate | 50% | 25% | 25% | V. Slight | OK | 44(1–60) | 40.6 | 3.01 | 2.65 | 42.8 |

**Complete Coagulation after 3 days
*Coagulated in 24 hours

It should also be noted that terpolymers are described by way of example and not by way of limitation and copolymers can also be employed.

Further copolymerizable monomers include derivatives of vinyl alcohol, e.g., aliphatic vinyl esters, the vinyl ester of Versatic acid, allyl esters of saturated monocarboxylic acids, aliphatic vinyl ethers, vinyl ketones, ethylenically unsaturated monocarboxylic and polycarboxylic, as well as the available anhydrides, nitriles, unsubstituted and substituted amides of said acids can be used. A more detailed list of monomers is found in U.S. Pat. No. 3,637,563, the relevant disclosure of which is incorporated herein by reference.

Analytical Techniques (a) Coagulum

Solids which were held in the 60 mesh screen are thoroughly washed, dried in a 110° oven for two hours and weighed. When the amount of solid present is too small to collect, or if the coagulum is water soluble, a qualitative description is recorded.

(b) Mechanical Stability

The filtered latex is placed in an Osterizer blender, and blended for 10 minutes at maximum speed. If the latex coagulates during this time, mechanical stability is no good.

(c) Brookfield Viscosity

The filtered latex sample is poured into a 8 oz. sample bottle. The viscometer is fitted with the proper spindle, set for the proper rpm, and lowered into the latex. The viscosity is read directly from a dial.

What we claim is:

1. An aqueous emulsion comprising the reaction product of a vinyl acid monomer and at least a second copolymerizable monomer, said vinyl acid monomer being present in an amount equal to about 5% to about 50% by weight based on a total weight of said vinyl acid monomer and said at least a second copolymerizable monomer, said surfactant being present in an amount equal to about 0.1 to about 10 weight percent based on the total weight of said vinyl acid monomer and said at least a second copolymerizable monomer, said surfactant being represented by the formula:

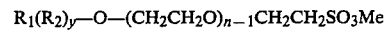

$$R_1(R_2)_y-O-(CH_2CH_2O)_{n-1}CH_2CH_2SO_3Me$$

wherein;
y is 0 or 1;
$R_1$ is an alkyl having at least 6 carbon atoms;
$R_2$ is an aryl group;
n is at least 3; and
Me is $NH_4$, Na, Li and K.

2. The aqueous emulsion of claim 1, wherein said at least a second monomer comprises from about 95% to about 50% of a monomer selected from the group consisting of acrylates, styrene or combinations thereof.

3. The aqueous emulsion of claim 1, wherein $R_1$ has from about 6 to about 18 carbons.

4. The aqueous emulsion of claim 1, where $R_1$ is a dialkyl having no greater than about 25 carbons, each alkyl group of said dialkyl having no greater than about 12 carbons.

5. The aqueous emulsion of claim 1, wherein Me is Na.

6. The aqueous emulsion of claim 1, wherein n is from about 6 to about 20.

7. The aqueous emulsion of claim 1, wherein said vinylic monomer contains an acrylic acid.

8. The method of producing a stable aqueous emulsion from a vinylic acid monomer and at least a second copolymerizable monomer, comprising the steps of contacting a plurality of copolymerizable monomers and a surfactant, at an elevated temperature and for a time period sufficient to copolymerize said monomers, said surfactant being represented by the formula:

$$R_1(R_2)_y\text{—O—}(CH_2CH_2O)_{n-1}CH_2CH_2SO_3Me$$

wherein;
Y is 0 or 1;
$R_1$ is an alkyl having at lest 6 carbon atoms,
$R_2$ is an aryl group;
n is at least 3; and
Me is $NH_4$, Na, Li or K.

9. The method of producing a stable aqueous emulsion of claim 8, wherein said at least a second monomer comprises from about 95% to about 50% of a monomer selected from the group consisting of acrylates, styrene vinyl acetate or combinations thereof.

10. The method of producing a stable aqueous emulsion of claim 8, wherein $R_1$ has from about 6 to about 18 carbons.

11. The method of producing a stable aqueous emulsion of claim 8, where $R_1$ is a dialkyl having no greater than about 24 carbons, each alkyl group of said dialkyl having no greater than about 12 carbons.

12. The method of producing a stable aqueous emulsion of claim 8, wherein Me is Na.

13. The method of producing a stable aqueous emulsion of claim 8, wherein n is from about 6 to about 20.

14. The method of producing a stable aqueous emulsion of claim 8, wherein said vinylic monomer contains an acrylic acid group.

15. The aqueous emulsion of claim 2, wherein said vinylic monomer contains an acrylic acid group.

16. The method of producing a stable aqueous emulsion of claim 9, wherein said vinylic monomer contains an acrylic acid group.

* * * * *